Aug. 18, 1953  N. ANTON  2,649,554
RADIATION INDICATOR
Filed July 29, 1949
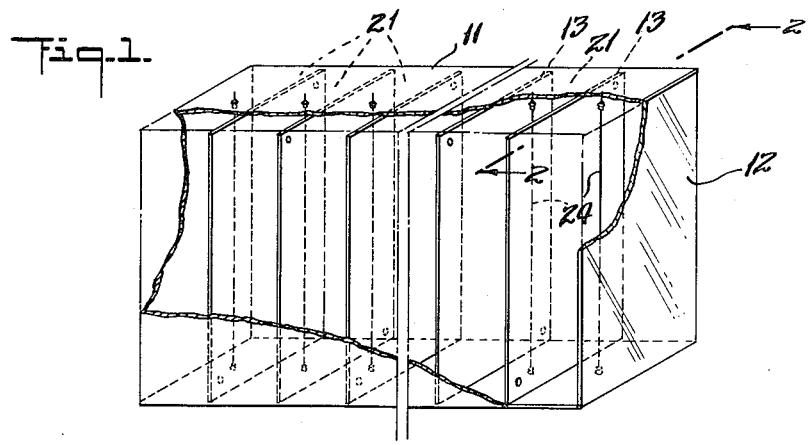
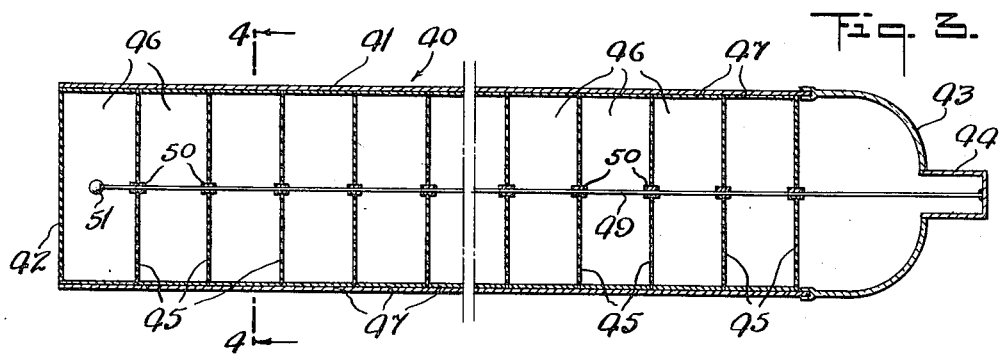
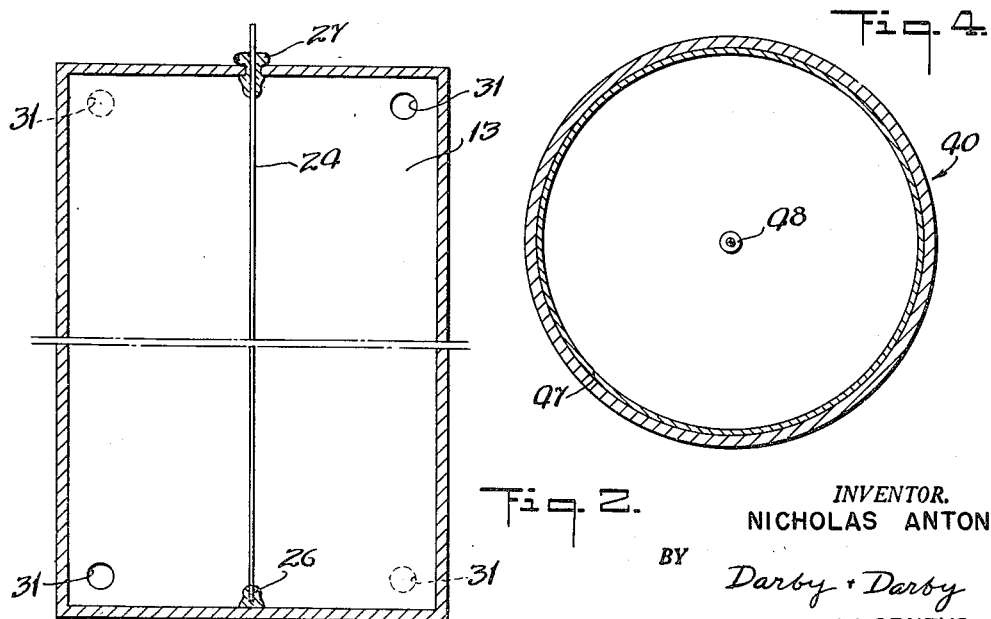
INVENTOR.
NICHOLAS ANTON
BY
Darby & Darby
ATTORNEYS Patented Aug. 18, 1953

2,649,554

UNITED STATES PATENT OFFICE 2,649,554

RADIATION INDICATOR

Nicholas Anton, Brooklyn, N. Y.

Application July 29, 1949, Serial No. 107,475

4 Claims. (Cl. 313—93)

The present invention relates to the art including measuring instruments for radiant energy, especially such energy as X-ray radiation and radiation from artificial or natural radioactive substances.

In my copending application, Serial No. 96,711 for Radiation Dosimeter, filed June 2, 1949, there are described certain novel features for radiation dosimeters permitting their use as direct-reading dosimeters over a wide band of radiation energy levels, for showing directly the effect of such radiation upon subjects exposed thereto. As is discussed there, in such dosimeters an important problem is to render them energy-discriminating; that is, to produce an indication in correspondence with the energy level of the impinging radiation being indicated. This is especially important in the Geiger counter types of indicator where in conventional indicators each photon of impinging radiation produces the same indication irrespective of the energy level of the photon.

The present invention is concerned with indicators for showing directly the dosage of radiation of either the gamma or beta type to which the subject may be exposed, irrespective of the energy level of the radiation over wide limits, whereby a rugged, field-type of indicator is provided.

In my above-mentioned prior application there is described in detail how to provide a chamber wall for such indicators which is energy-discriminating for gamma radiation over the desired wide band of energy levels. The present invention is particularly concerned with the added provision of special arrangements which will provide similar energy-discrimination for beta radiation, whereby when the present invention is used apart from the gamma radiation energy-discrimination scheme of the prior application a practical and improved beta radiation dosimeter is provided, whereas by combining the present invention with that of the prior application a dosimeter is provided directly responsive to beta and/or gamma radiation either individually or in any combination which may be experienced.

To effectuate these purposes the present invention has as an important feature the provision of a plurality of chambers whose outputs may be individually or additively indicated, the chambers being specially arranged so that the number of chambers excited by any particular quantum or photon of beta radiation is dependent upon the energy level of that quantum or photon, so that the indication derived has correspondence with the energy level of the impinging beta radiation.

For this purpose the chambers are formed by providing partitions in a common housing; each of these partitions is designed and selected to absorb a pre-determined amount of energy from the beta radiation impinging thereon. In this way radiation having the lowest energy level will enter only the first chamber and will be absorbed therein or in the wall thereof. Radiation having slightly higher energy will pass through the partition between the first two chambers with an energy decrement corresponding to that for which the partition is designed and will thereby excite the second chamber. Radiation of still higher energy level will pass through successive partitions with equal energy decrements produced by each and will thereby excite a plurality of chambers. In this way, the number of chambers excited and the intensity of excitation thereof provide an energy spectrum analysis of the entire impinging radiation.

The detailed features and other objects and advantages of the present invention will become more apparent from consideration of the following description of a preferred embodiment thereof, taken in conjunction with the appended drawings, in which—

Figure 1 shows a perspective view partly broken away of one form of the present invention;

Figure 2 shows a cross-sectional view of the apparatus of Figure 1 along plane 2—2 thereof;

Figure 3 is a longitudinal cross-sectional view of another form of the present invention; and Figure 4 is a transverse cross-sectional view of the device of Figure 3 along plane 4—4 thereof.

The form of the invention shown in Figures 1 and 2 comprises a container 11 generally in the form of a rectangular parallelepiped having a beta-ray-admitting window or face 12. The container 11 may be of any suitable conductive material, preferably of the lighter, lower atomic number elements, adapted for vacuum tight seals. The use of low atomic number materials minimizes the background interference. The window 12 is formed of material adapted to permit beta rays to enter the chamber, and is preferably a metallic material of a weight about 3 milligrams per square centimeter; aluminum foil and mica are satisfactory materials.

The container 11 is subdivided into a plurality of chambers 21 by means of parallel partitions 13, preferably of a material also having a weight of about 3 milligrams per square centimeter. One such material is aluminum, fashioned in sheets or foil fixed to the outer walls of container 11. Mounted in insulated fashion within each of the chambers 21 is a respective anode wire or rod 25, each shown as fixed to an insulating support 26 at the bottom of its chamber and passing through an insulating seal 27 at the top of its chamber. The partitions 13 are provided with relatively staggered apertures 31 to permit equalizing of pressures in each of the chambers 21.

The container 11 is filled with a gas adapted for proportional counter or Geiger counter action, under suitable pressure. Such gas may be hydrogen, for example, or argon, neon or other inert gas plus a vapor, such as alcohol, chlorine, amyl acetate, ethyl ether, methyl bromide, or the like. The pressure in the container 11 may range from a few millimeters of mercury to several atmospheres, as desired. In one illustrative embodiment, the container may have a cross-section about 2 inches by 2 inches, and a length as required for the number of chambers.

The container 11 forms the cathode of the indicator tube, while each of the wires or rods 25 forms an anode. A voltage of the order of from 100 to 2000 volts is normally applied between cathode and anode.

In operation beta rays will enter through the thin window 12 and will thereby ionize the gas within the chamber 21 to cause a secondary electron burst or shower flowing to the anode 24 to produce a count. The voltage and pressure may be chosen to yield either proportional counter operation, or Geiger counter operation, as desired. If the beta ray is of low energy, only the first chamber 21 will be fired. If of slightly higher energy the beta ray will penetrate through the first chamber through the partition 13 between the first and second chambers and will also fire the second chamber to produce a further count. It will be understood that in passing through the partition, the energy level of the beta ray is diminished by an amount dependent upon the mass of the material penetrated which is, of course, proportional to the thickness and density of the material. The number of partitions penetrated will be proportional to the energy level of the incoming ray. In this way the energy of the beta ray in relation to the absorption characteristics of the partitions will determine how many of the chambers will be fired. Since the outputs from these chambers are derived independently from the respective anodes 24, an indication may be derived corresponding to the energy of the impinging beta ray either by the use of coincidence circuits or by rate meter methods or by adding the outputs of all anodes, in many other well known similar or equivalent ways. Thus by indicating the output of only a single anode, a reading is obtained of the relative amount of beta particles of the energy level corresponding to the position of the chamber containing that anode. By separately indicating the several anode outputs, an energy-spectrum analysis of the incoming beta rays is obtained. On the other hand, by combining the anode outputs additively, as by coincidence circuits or by connecting them in parallel, an output is obtained representing the energy level of the impinging radiation, which can be used as a direct-reading dosage indication.

It will be understood that, by using as the wall of container 11 the special arrangement of materials described in my above-mentioned prior application, the indicator is made direct-reading in dosage of gamma as well as beta radiation.

Figures 3 and 4 illustrate a further form of energy discriminating beta ray indicator. In this case the container 40 has a cylindrical outer wall 41 closed at one end by a gastight insulating window, such as of thin mica or the like, and closed at the other end by an insulating glass end bell 43 carrying an anode terminal 44 which may be similar to the conventional grid terminal of electron vacuum tubes. Supported within the shell 41 are a plurality of insulating partition disks 45 equally spaced along the axis of the counter tube to subdivide the space within the tube into a plurality of equal sized chambers 46. One means of locating these partition disks 45 is by the use of conductive cylindrical spacers 47 snugly fitting the inner surface of the shell 41, each of the partition disks 45 being held between two of these spacer cylinders 47. Each of the partition disks 45 is centrally apertured as shown at 48 and a thin anode wire which, for example, may be approximately $\frac{1}{32}$ inch in diameter, extends from the anode terminal 44 axially of the shell 41 to terminate in an enlarged end 51 within the end-most chamber 46. The anode wire 49 may be formed sufficiently stiff to retain its position or it may be supported by the partition disks 45 as desired. Each disk 45 tightly fits anode 49; if desired, gastight bushings such as 50 may be used. The partition disks 45 thus prevent the avalanche of electrons in any one chamber 46 from ionizing other chambers 46. In this way each of the chambers 46 can be fired only by a beta ray particle.

Thus, a low energy beta particle may fire only the left-most chamber 36 which will produce an avalanche in that chamber creating an output anode current pulse of predetermined amplitude determined by the dimensions of the chamber, the voltage applied between anode and cathode, the material of the chamber and its window 42 and the character and pressure of the gas within the shell 41. A beta particle of higher energy will pass through the left-most chamber 46 through the first partition disk 45 and into the second chamber 46 to produce a further avalanche there. This will increase the magnitude of the pulse derived from the anode current. Thus, in general, the energy of the beta particle will determine how many chambers 46 are fired, which in turn determines the magnitude of the pulse derived from the anode electrode. The magnitude of this pulse thus corresponds to the energy level of the beta particle to provide the desired beta energy-discrimination scheme discussed above.

It will be understood that in this form of the invention also the wall of container 40 may be designed as described in my above-identified prior application, to yield gamma energy discrimination in addition to beta energy discrimination. The container 40 may use the same gases, pressures and voltages discussed relative to Figures 1 and 2.

Since there are many other modifications which can be readily conceived without departing from the spirit of the present invention, it is to be understood that the above description is intended to be illustrative only, and is not to be considered in a limiting sense, the present invention being defined solely by the appended claims.

The term "anode means," used in the following claims, means either separate anodes as in Figure 1, or a single anode as in Figure 3.

I claim:

1. Apparatus for detecting the energy spectrum of beta radiation in terms of amount of beta radiation in each of a plurality of predetermined energy incremental intervals, comprising a casing having beta-radiation-impermeable walls except for a beta-radiation-permeable wall portion, a plurality of electrically conductive partitions within said casing each directly electrically connected to the conductive walls of said casing to form separate chambers within said casing, and arranged substantially parallel to said beta-permeable wall portion, whereby beta radiation passing through said permeable wall portion may also pass through certain of said partitions in dependence upon the energy level of said entering radiation, each of said partitions being permeable to beta radiation but absorptive of a predetermined increment of such radiation respectively correlated to incremental energy levels to be detected, an anode within each of the chambers formed by said partitions and casing walls, and a gas ionizable by beta radiation contained within each of said chambers.

2. Apparatus as in claim 1, wherein each of said anodes comprises a wire positioned substantially centrally of a respective one of said chambers and substantially parallel to said partitions.

3. Apparatus as in claim 1, wherein each of said partitions has an area density less than 100 milligrams per square centimeter.

4. Apparatus as in claim 3 wherein said partitions have an area density of the order of 3 milligrams per square centimeter.

NICHOLAS ANTON.

References Cited in the file of this patent

UNITED STATES PATENTS

| Number | Name | Date |
|---|---|---|
| 2,383,478 | Friedman et al. | Aug. 28, 1945 |
| 2,397,073 | Hare et al. | Mar. 19, 1946 |
| 2,397,661 | Hare | Apr. 2, 1946 |
| 2,445,305 | Hochgesang | July 13, 1948 |
| 2,531,144 | Manley | Nov. 21, 1950 |

OTHER REFERENCES

Curran et al.: Review of Scientific Instruments, vol. 19, Feb. 1948, pp. 67–75.

"Electron and Nuclear Counters," Korff, publ. by Van Nostrand Co. Inc., New York, 1946, pgs. 128–130.

"Atomic Physics," University of Pittsburgh Physics Staff, published by John Wiley & Sons, Inc., New York, N. Y., 1937, 2nd edition, p. 234.